United States Patent
Bracich

[11] 3,823,926
[45] July 16, 1974

[54] HUMIDIFIER
[75] Inventor: Louis A. Bracich, Cary, Ill.
[73] Assignee: Nu-Air Humidifier Corporation, Rosemont, Ill.
[22] Filed: June 21, 1973
[21] Appl. No.: 372,036

Related U.S. Application Data
[63] Continuation of Ser. No. 136,824, April 23, 1971, abandoned.

[52] U.S. Cl..................... 261/106, 55/233, 55/504, 261/DIG. 15
[51] Int. Cl............................................... B01f 3/04
[58] Field of Search ........ 261/DIG. 15, 105, 96, 97; 55/493, 507, 504, 509, 233; 126/113

[56] References Cited
UNITED STATES PATENTS

| | | | |
|---|---|---|---|
| 1,746,283 | 2/1930 | Reed et al.............................. | 55/509 |
| 2,137,905 | 11/1938 | Church et al......................... | 55/233 |
| 2,252,724 | 8/1941 | Myers................................... | 55/504 |
| 2,620,722 | 12/1952 | Owens.............................. | 55/233 X |
| 2,847,989 | 8/1958 | Powers et al. ............... | 261/DIG. 15 |
| 3,075,750 | 1/1963 | Goettl.............................. | 55/493 X |
| 3,171,401 | 3/1965 | McDuffee...................... | 261/DIG. 15 |
| 3,472,496 | 10/1969 | Coleman et al............. | 261/DIG. 15 |
| 3,636,683 | 1/1972 | Francis et al. ...................... | 55/493 |

FOREIGN PATENTS OR APPLICATIONS

| 1,228,872 | 4/1971 | Great Britain....................... 55/504 |
|---|---|---|

*Primary Examiner*—Frank W. Lutter
*Assistant Examiner*—Vincent Gifford
*Attorney, Agent, or Firm*—Richard D. Mason

[57] ABSTRACT

A humidifier apparatus is provided for use with a furnace system which includes means to circulate heated air. The humidifier apparatus includes a housing formed of a fixed frame member and a readily detachable cover member. The fixed frame member is adapted to be secured to an air conduit of a furnace system and mounts a filter pad or liquid-air contactor. The cover member is readily detachably assembled to the frame member so that the cover may be removed without disturbance of the filter pad or other humidifier elements.

3 Claims, 6 Drawing Figures

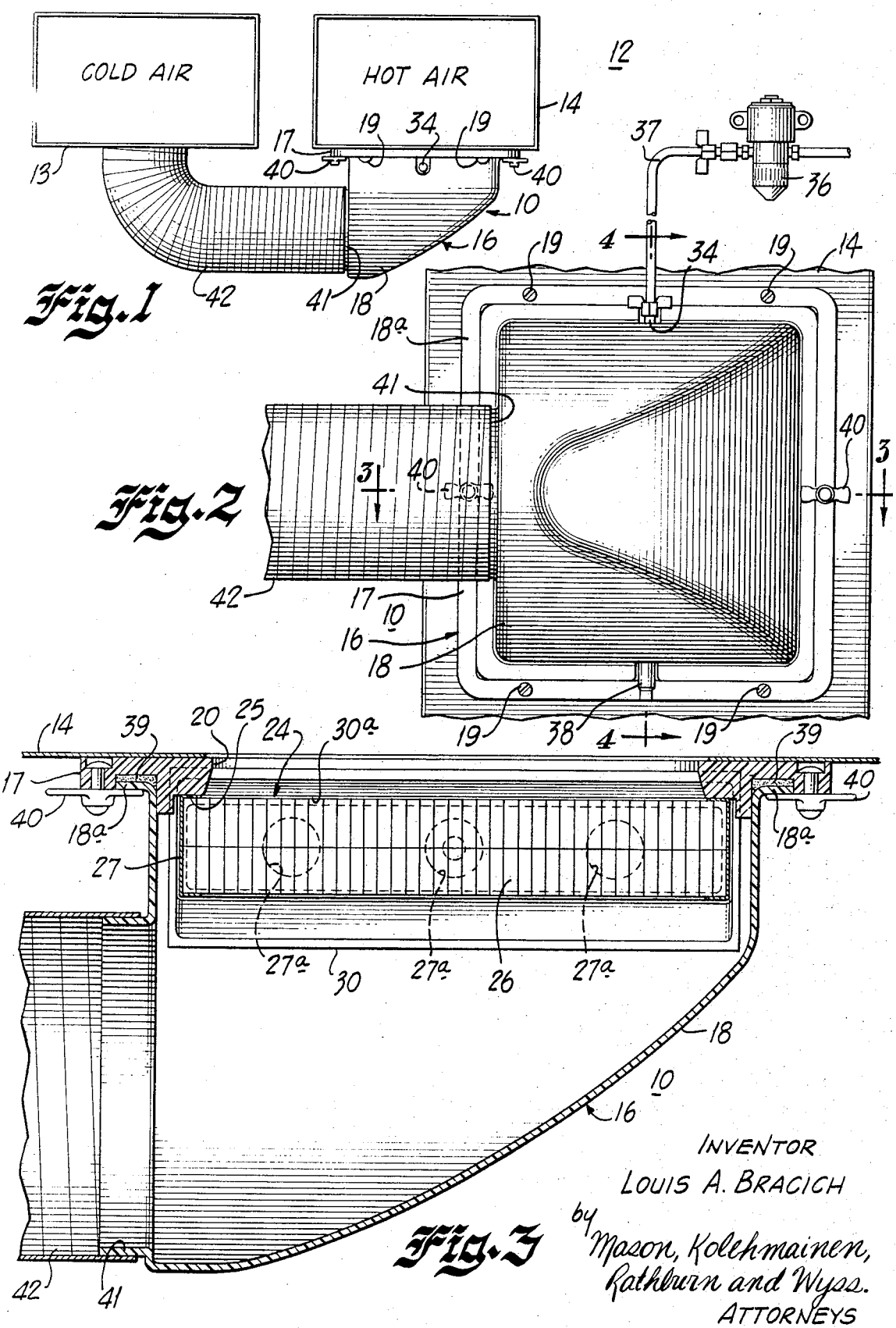

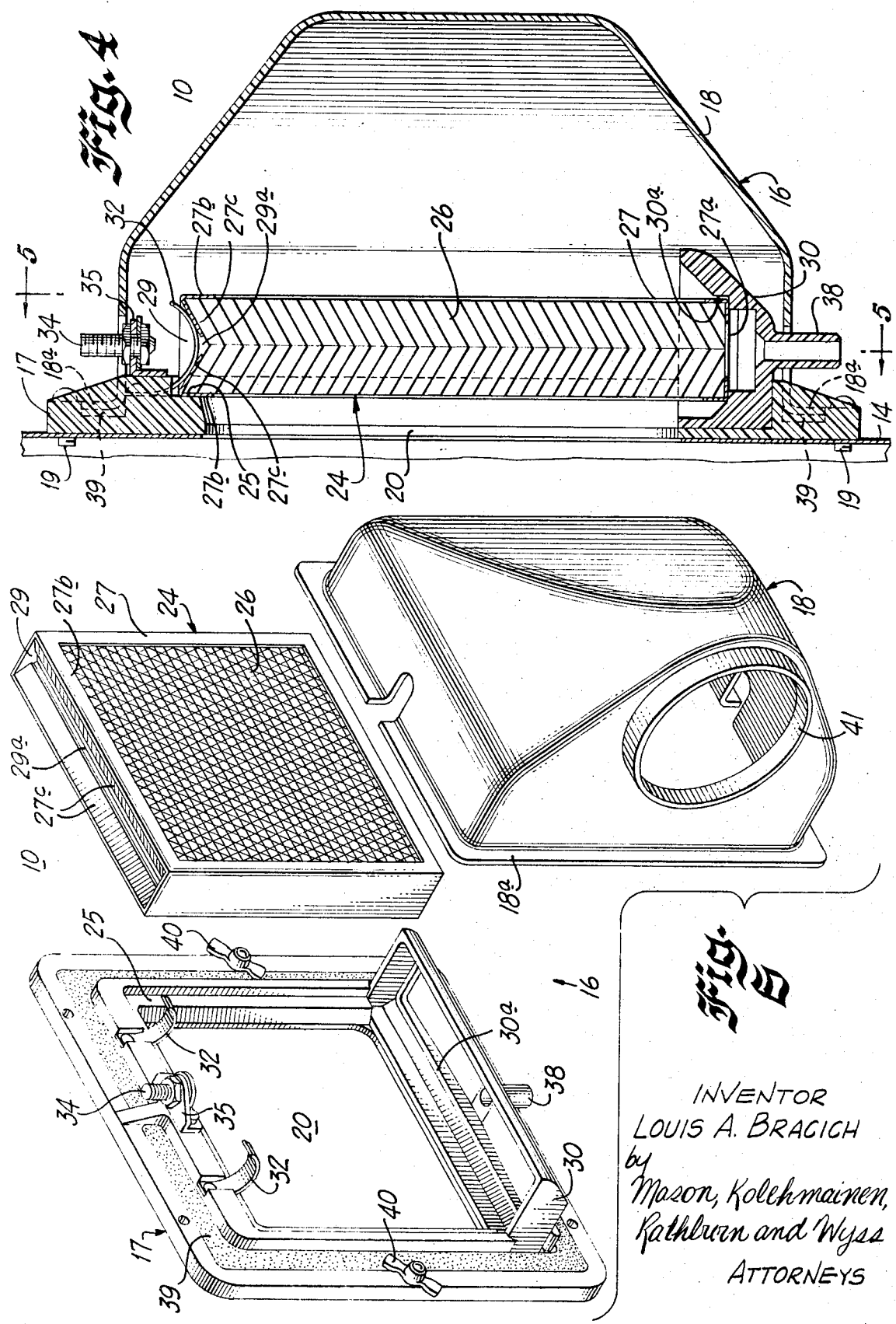

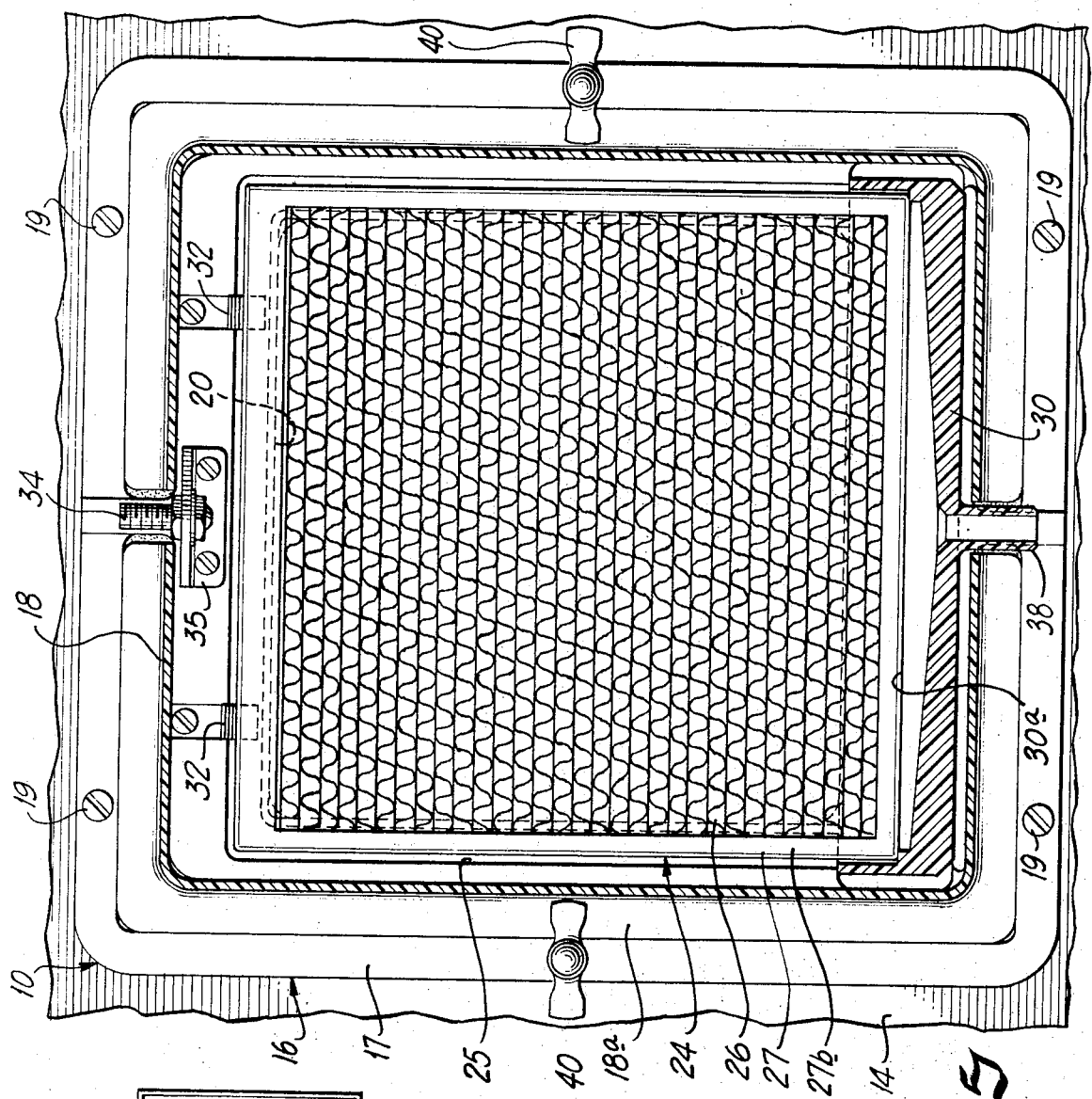
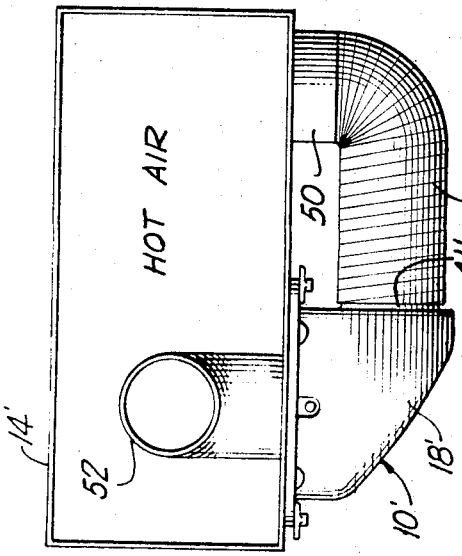

HUMIDIFIER

This is a continuation of application Ser. No. 136,824, filed Apr. 23, 1971 and now abandoned.

The present invention relates to a new and improved humidifier, and more particularly, to a humidifier apparatus for use with a furnace system which includes means to circulate heated air.

More specifically humidifiers for use with a furnace system are known in the art wherein a portion of the circulated air is directed through a gas-liquid contactor or filter pad. One suitable filter pad element is that disclosed in U.S. Pat. No. 3,523,681 granted Aug. 11, 1970 to Richard C. Jaye. This Jaye patent discloses a gas-liquid evaporator unit having a honeycomb body comprised of water absorptive material such as corrugated paper — like strip material with corrugations defining cells that open to the opposite faces of the body. Water can be introduced into the interior of the body of absorption by the walls of its cell and for evaporation and transfer to air circulated through the cells. Other types of filter pads are also known and may be used in the humidifier of the present invention. The efficiency of such filter pads will be affected if they become coated with deposits from the water and accordingly it is necessary that the filter pads be periodically serviced and replaced. However, heretofore difficulty has been experienced in the removal and replacement of the filter pads. This is particularly true in household furnace systems where the pad may frequently be serviced by housewives and other laymen.

Accordingly, it is an object of the present invention to provide a new and improved humidifier apparatus which is compact and inexpensive and which provides a desirable flow through a gas-liquid contact pad.

Yet another object of the present invention is the provision of a new and improved humidifier apparatus wherein the gas-liquid contact pad or filter pad may be readily and easily serviced and replaced.

Yet another object of the present invention is the provision of a new and improved humidifier apparatus.

Briefly, in accordance with the present invention there is provided a new and improved humidifier apparatus for use with a furnace system which includes means to circulate heated air. The humidifier apparatus includes a housing formed of a fixed frame and a readily detachable cover. The fixed frame includes a frame portion adapted to be secured to an air conduit of a furnace system and which defines an air opening with the conduit. Means are provided for detachably securing a filter pad to the frame member across the opening. Means are also provided for directing a flow of liquid such as water over the filter pad. The cover is detachably assembled to the frame and includes an air inlet so that an air path is provided from the air inlet through the filter pad and into the air conduit of the furnace. The cover may be readily separated from the frame without removal of the filter pad or disturbance of the other components of the humidifier.

The invention will best be understood with reference to the accompanying drawings wherein;

FIG. 1 is a somewhat schematic representation of a furnace system employing the humidifier apparatus according to the present invention;

FIG. 2 is a plan view of the humidifier apparatus of FIG. 1 according to the present invention;

FIG. 3 is a cross-sectional view of the humidifier apparatus of FIG. 2, taken along line 3—3 of FIG. 2;

FIG. 4 is a cross-sectional elevational view of humidifier apparatus of FIG. 2, taken along line 4—4 of FIG. 2;

FIG. 5 is a cross-sectional elevational view of the humidifier apparatus of FIG. 2, taken along line 5—5 of FIG. 4;

FIG. 6 is an exploded perspective view of the humidifier apparatus according to the present invention; and FIG. 7 is a fragmentary, somewhat schematic representation of another furnace system employing the humidifier apparatus according to the present invention.

Referring now to the drawings, and particularly to the embodiment of FIGS. 1 through 6, there is illustrated a humidifier apparatus 10 according to the present invention and installed in a furnace system 12, FIG. 1. The furnace system 12 includes a cold air conduit or plenum 13 and a hot air conduit or phenum 14. It will be understood that mechanical means, such as a blower, will be used to create flow of cold air from the cold air conduit 13 through a heat exchanger and into the hot air conduit 14. Moreover, the hot air conduit 14, in the illustrated embodiment is a main conduit from which branch conduits will carry heated and humidified air to various rooms or locations. Moreover, as illustrated, FIG. 1 represents a plan view of the furnace system so that the illustrated cold and hot air conduits are vertical in the illustrated location.

The humidifier apparatus includes a housing 16 having a frame 17 and a cover 18. The frame 17 is adapted to be fixedly secured to an air conduit, here illustrated as the hot air conduit 14, in any suitable manner as by the fasteners 19, and the defines an air opening 20, FIG. 6, into the conduit 14.

For providing a gas-liquid contact means, there is provided a gas-liquid contactor or filter pad 24 mounted in a peripheral recess 25 in the body of the frame 17 across the air opening 20. The filter pad 24 may be of the type discribed in the above mentioned Jaye patent, or may be of any other suitable type to provide an evaporator surface to bring about a gas-liquid contact process. In the illustrated embodiment, there is provided a filter pad having a honeycomb or corrugated body 26 of water absorptive material with the corrugations defining cells that are open to the opposite faces of the body permitting for the travel of air therethrough. The filter pad 24 also includes a rigid filter frame 27 around the body 26 to provide rigidity and support to the filter pad. The sides and bottom of the filter frame 27 may be of general U-shape in cross-section with drain holes 27a in a bottom surface. The top of the filter frame includes a pair of opposed side portions 27b FIGS. 4 and 6 and upper downwardly deflected surfaces 27c together defining a somewhat upper trough 29 open at its bottom as shown at 29a, FIG. 4.

The filter pad 24 is readily detachably mounted to the frame 17 in any suitable manner, and in the illustrated embodiment, there is provided a lower drain or collecting trough 30 integrally formed with the frame 17, and a having an alignment recess 30a receiving and positioning the bottom edge of the filter pad 24. Thus, the filter pad 24 may readily be assembled to the frame 17 by the mere insertion of its lower edge into the recess 30a, and pivoted to fit into the peripheral recess 25 at its side and top. Retaining springs 32 secured to the upper edge of the frame 17 will snap into the trough 29 of the filter pad 24, as illustrated in FIG. 4, to retain the filter pad 24 in place. The filter pad 24 may be disassembled from the frame 17 by merely pulling the upper edge thereof outwardly to free the filter from engagement by the retaining springs 32, and then lifting the filter pad 24 from the trough 30.

To provide a supply of liquid for the humidifier apparatus 10, there is provided a nozzle 34 positioned on a suitable projection or bracket 35 to open directly above the trough 29 so as to direct fluid flow into the trough 29. A remote water valve 36, FIG. 2, is connected to the nozzle 34 by a suitable tube or pipe 37 to control the rate of liquid flow. The water valve 36 may be solenoid controlled, and may be tied in with the controls of the furnace system 12 in any desired manner. Thus, fluid will flow over the filter pad 24, and excess fluid will pass through the drain holes 27a in the bottom surface thereof and into the collecting trough 30. As illustrated in FIG. 5, the surface of the collecting trough 30 slopes downwardly toward a drain opening 38 so that excess liquid may be removed from the humidifier apparatus. If desired such excess liquid may be collected and recirculated; if desired such excess liquid may be discharged to drain.

In accordance with the present invention the cover 18 is detachably secured to the frame 17 in any suitable manner, and in the illustrated embodiment, the cover 18 is provided with a peripheral flange 18a which seats against the frame 17 through a sealing gasket 39 and suitable wing fasteners 40 are provided a sealing gasket 39 and suitable wing fasteners 40 are provided for locking the cover 18 to the frame 17. The cover 18 is somewhat dome shaped, having an air inlet 41. In the illustrated embodiment, a flexible air line 42 connects the air inlet 41 and the cold air conduit 13.

Thus, it will be seen that in accordance with the present invention the cover 18 may be removed from the frame 17 by the mere loosening of the fasteners 40 and the separation of the cover 18 therefrom. The filter pad 24 may be readily snapped out of place and removed from the frame 17, and may be serviced or replaced by a new filter merely by insertion of the lower edge of the new filter into the recess 30a in the collecting trough 30 and the snapping of the filter into locking engagement with the springs 32. Moreover, the servicing of the filter pad 24 is accomplished without disturbing the water system.

Although the described embodiment is shown as bypassing air from the cold air conduit 13 to the hot air conduit 14, it is numerous other modifications and embodiments may be devised by those skilled in the art, and it is intended by the appended claims to cover all such modifications and embodiments as fall within the true spirit and scope of the present invention.

What is claimed as new and desired to be secured by Letters Patent of the United States is:

1. A humidifier apparatus for use with a furnace system which includes an air conduit and means for circulating heated air, said humidifier apparatus comprising:

a housing formed of a fixed frame conduit and a readily detachable cover conduit longitudinally positioned relative to said fixed frame conduit, said fixed frame conduit fixedly secured to said air conduit and defining an air opening to said air conduit, said cover conduit including an air inlet whereby there is provided an air path from said inlet through said cover conduit and frame conduit and into said air conduit, means for detachably securing said cover conduit to said fixed frame conduit, a filter pad removably held transverse of said air path and generally parallel to the connection between said fixed frame conduit and said cover conduit, said filter pad having a feed trough in its upper end, said feed trough being open along its bottom along substantially the entire upper edge of said filter, a collecting trough integrally formed with the fixed frame conduit along its base, said trough having a drain opening, said fixed frame conduit is provided with means for securing said filter pad in place which comprises a peripheral recess adjacent said air opening for positioning the sides of said filter, a lower alignment recess in said collecting trough for receiving and positioning the bottom edge of the filter pad, and retaining means secured to the upper end of said fixed frame conduit for retaining the filter pad along its feed trough upon movement of the upper edge of said pad longitudinally of said frame member, means positioned above said feed trough for directing water into said feed trough so that water will flow by gravity over said filter pad with excess water being collected in said collecting trough, and a flexible conduit connected to said air inlet whereby said cover member may be readily separated from said frame member when said filter pad is to be removed.

2. A humidifier apparatus as defined by claim 1 wherein said filter pad is made of a honeycombed or corrugated body of absorptive material.

3. A humidifier apparatus as defined by claim 2 wherein the retaining means comprises a pair of retaining springs.

* * * * *